United States Patent [19]

Featon et al.

[11] Patent Number: 4,966,392

[45] Date of Patent: Oct. 30, 1990

[54] WHEELCHAIR AND OCCUPANT RESTRAINTS

[75] Inventors: Robert J. Featon, East Keilor; James W. Fowler, Springvale; Barry J. Miles, East Keilor, all of Australia

[73] Assignees: Australian Mobile Tech Corporation Pty. Ltd., Keilor-Victoria; Freight Lok Pty. Ltd., Springvale-Victoria, both of Australia

[21] Appl. No.: 349,103

[22] Filed: May 9, 1989

[51] Int. Cl.[5] .......................... B60N 1/02; A61G 5/00

[52] U.S. Cl. ................................ 280/801; 280/304.1; 296/65.1; 297/DIG. 4; 410/7

[58] Field of Search ............... 280/657, 642, 650, 801, 280/643, 242.1, 742, 743, 730, 250.1, 290, 304.1; 297/485, 486, 440, DIG. 4; 410/7, 8, 51, 52; 296/65.1

[56] References Cited

U.S. PATENT DOCUMENTS

| | | | |
|---|---|---|---|
| 4,688,843 | 8/1987 | Hall | 280/250.1 |
| 4,728,119 | 3/1988 | Sigafoo | 280/657 |

*Primary Examiner*—Richard A. Bertsch

*Attorney, Agent, or Firm*—Fleit, Jacobson, Cohn, Price, Holman & Stern

[57] ABSTRACT

A harness for securing within a vehicle a wheelchair in which an occupant is secured by a lap-belt, the harness being attached not to the chair itself but to side buckles movable relative to the chair and/or occupant, the buckles being attached to the ends of the lap belt, to anchor straps tending to pull the buckles downwardly and rearwardly, and holding straps associated with the anchor straps and connected to forward parts of the buckles via parts of the chair frame so as to tension the buckles forwardly in response to decelerating forces applied direct to the chair.

6 Claims, 3 Drawing Sheets

FIG. 2.
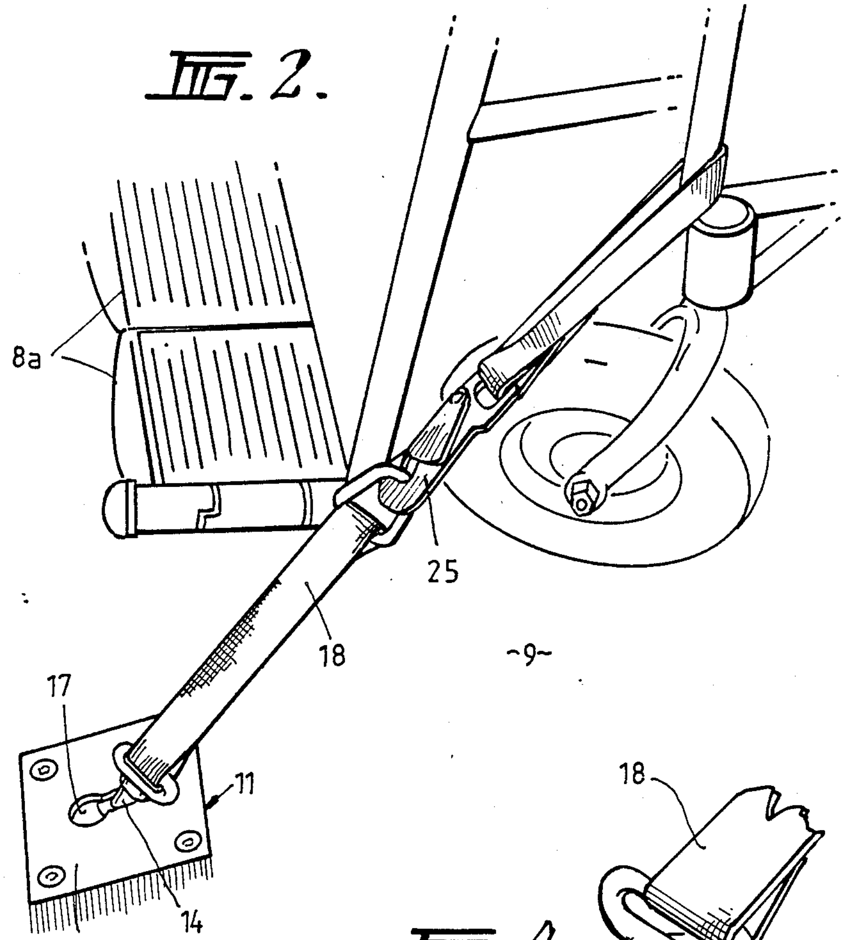
FIG. 4.
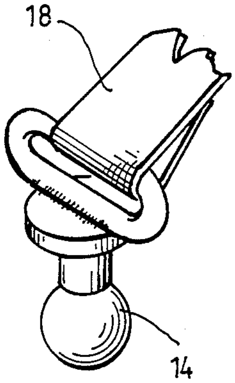
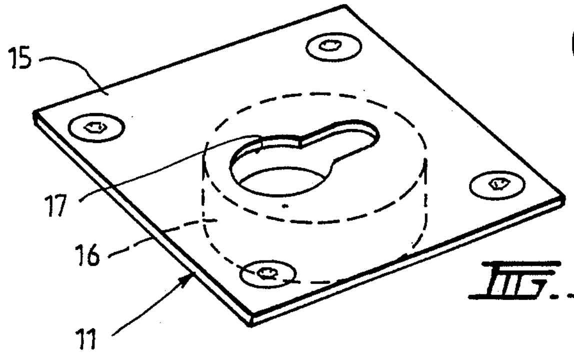
FIG. 3.

WHEELCHAIR AND OCCUPANT RESTRAINTS

This invention relates to the restraint of a wheelchair or like seat (hereinafter called a "chair") and its occupant in the event that the chair with its occupant are to be transported by means of a vehicle (including aircraft) or some either conveyance susceptible of very high, if transitory, accelerations (including decelerations) as in the case of an accident involving the vehicle.

It is usually better that the person be removed from the chair and seated in one of the usual seats with a usual seat-belt, the chair being carried independently as baggage.

However there are those whose disabilities render it undesirable for them to be removed from the chair for transport purposes. It is therefore often necessary to provide special means of restraint taking account not only of the inertia of the occupant himself, but also that of the chair which, unless suitably fastened to the vehicle, might aggravate injury to the occupant e.g. by pushing him too violently against the belt and, in an extreme case, increasing his effective weight by the weight of the chair.

A typical system includes two front and two rear anchor points on the platform, to which points the chair is fastened, such as by straps e.g. webbing belts, with the seating reference plane at right angles to the platform and parallel to its direction of motion. Usually the straps are attached to the chair by clips. The anchor points are symmetrically disposed with respect to the seating reference plane and are transversely spaced by a distance substantially equal to the width of the chair. The front and rear anchor points may be longitudinally spaced by an adjustable distance, which may depend on the length and type of chair, and/or the lengths of the front and/or rear straps may be adjustable.

In one known system, restraints are attached to the chair frame. Such a connexion is very liable to breakage and to expose the occupant and others in the vehicle to the risk of serious injury.

An object of the invention is to provide a very safe and relatively simple system for restraining a wheelchair and its occupant on what may for convenience by described as a movable platform, which may be, for example, the floor of a vehicle.

Another object is to provide a system which complies with a typically stringent governmental standard e.g. Australian Standard 2942-1987 "Wheelchair Occupant Restraint Assemblies for Motor Vehicles".

Other objects and advantages will become apparent hereinafter.

Accordingly the present invention provides a safety harness for a wheelchair/occupant system being or to be transported on a movable platform liable to sudden stoppage or other potentially dangerous rearward impulse, the platform having associated therewith rear anchor means to which the harness is adapted to secure the system, said harness including a lap belt for the occupant and on each side of the chair a buckle providing a connexion movable relative to the system, said buckle being connected or connectible to the nearer end of the lap belt, an anchor strap tending to pull the buckle downwardly and rearwardly, and a holding strap associated with the anchor strap but connected or connectible to a forward part of the buckle via a chair part so that the buckle is pulled forwardly in response to decelerating forces applied direct to the chair via the holding strap.

But in order that the invention ma be better understood reference will now be made to the accompanying drawings which are to be considered as part of this specification and read herewith. In the drawings:

FIG. 2 is perspective showing the left front strap connexion of the harness shown in FIG. 1;

FIG. 3 is a perspective view of a floor baseplate forming part of front and rear anchors for the harness shown in FIGS. 1 and 2;

FIG. 4 shows an eyebolt forming part of front and rear anchors for the harness shown in FIGS. 1 and 2, for reception in the baseplate shown in FIG. 3.

Figure 1:
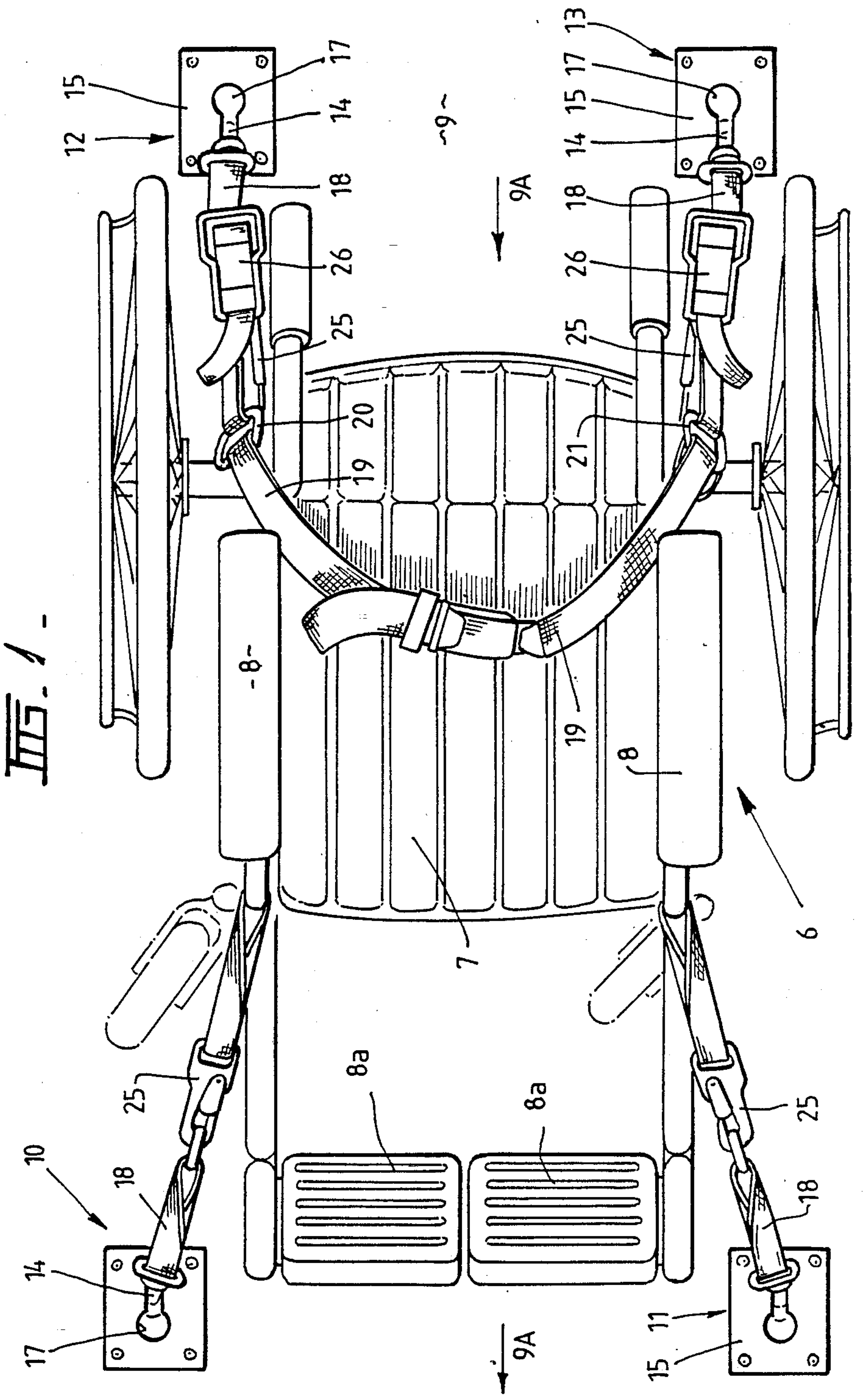
FIG. 1 is a top plan view of a wheelchair (occupant not shown) secured or harnessed to the floor of a vehicle in accordance with a practical embodiment of the invention.

Referring to the drawings in more detail, there is shown a wheelchair 6 having a seat 7, armrests 8 and footrests 9 for an occupant (not shown). The chair and occupant comprise a system of two masses to be interharnessed, and also harnessed to platform 9 which may be the floor of a vehicle forwardly movable in the direction indicated by arrow 9A.

Flush-fitted into platform or floor 9 are right and left front baseplate units 10, 11 and rear baseplate units 12, 13 adapted removably but securely to receive eyebolts such as 14 (FIG. 4) whereby the four harness components are securable to the floor 9 but can be manually disengaged, if necessary, when harness tension is suitably relieved. As best seen in FIG. 3, the baseplate unit includes a top plate 15 underneath which is a receptacle 16 for the eyebolt via keyhole aperture 17. Eyebolt 14 is attached to the end of anchor strap 18. The baseplate units are bolted or otherwise firmly fastened to floor 9, the lastmentioned being suitably recessed as necessary in order to accommodate the unit, with plate 15 flush with the floor.

When the unit is not in use, aperture 17 may be automatically closed by a spring-loaded depressor plate (not shown) within receptacle 16.

Therefore to attach the anchor it suffices to insert eyebolt 14 into the larger part of aperture 17 (by pushing it against the spring-pressure of the depressor plate when provided) and allowing tension in the associated anchor strap 18 to pull the bolt rearwardly (in the case of 10 and 11) or forwardly (in the case of 12,13) so that the bulbous part of the bolt is caught under the narrow part of the keyhole aperture.

Figure 5:
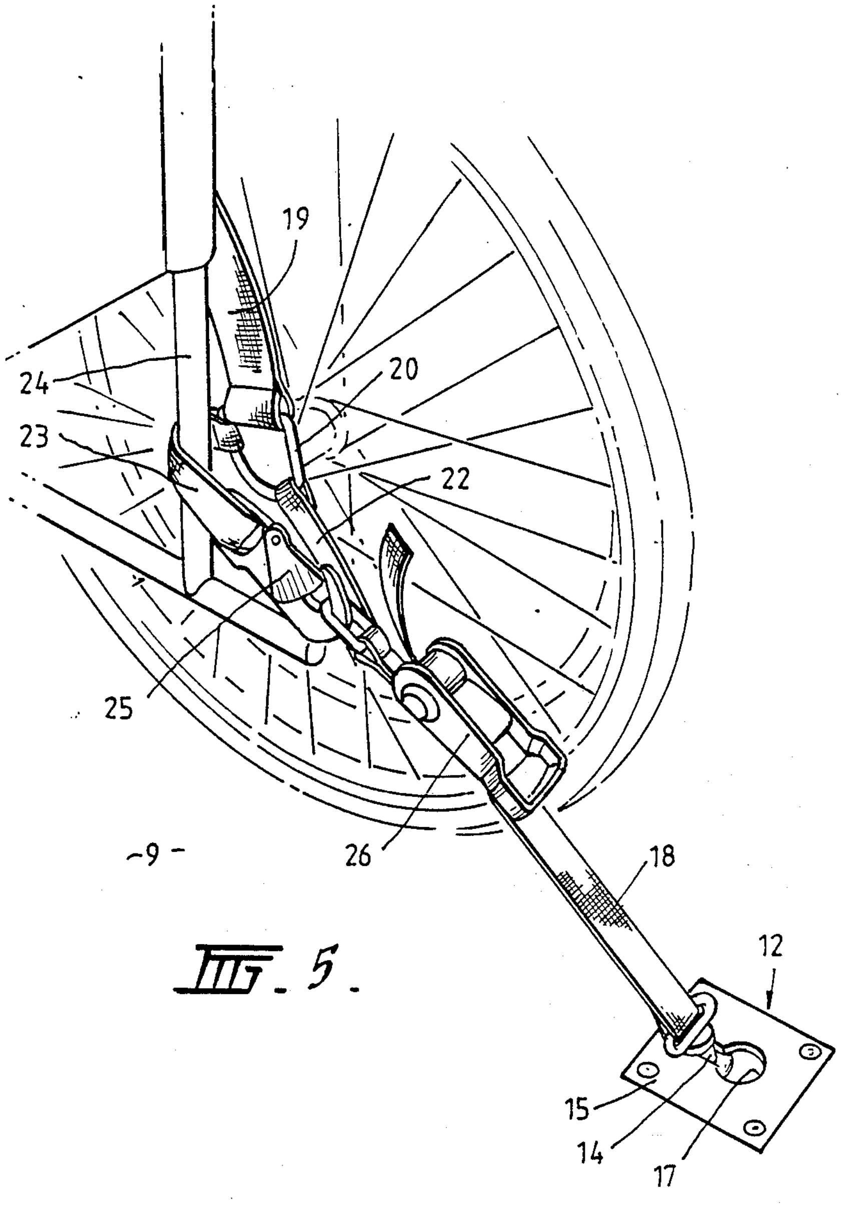
FIG. 5 is a perspective showing the right rear strap connexion of the harness shown in FIG. 1.

The harness includes a lap belt 19 for the occupant and on each side of the chair a buckle 20, 21 in the form of D-shaped clips, providing strap connections which are stable but "floating" i.e. movable relative to chair and/or occupant. As best shown in FIG. 5, each buckle is connected to the relevant (i.e. nearer) end of lap belt 19, and to the relevant anchor straps or strap assembly 18 both directly by connection strap 22 and also by holding strap 23 which is passed around chair post 24.

Evidently, then, buckles 20, 21 are generally subject to three forces viz. the connection straps tending to pull the buckles downwardly and rearwardly, the holding straps forwardly and the lap belt upwardly and forwardly. It also appears that the retarding forces which are applied direct to the chair (by holding straps 23 passing around posts 24) also tend to pull the buckles forwardly.

The anchor strap assemblies may including quick-release clips such as 25 of a kind known per se.

Should the platform be suddenly decelerated, as in the case of a head-on collision, the inertia of the chair and its occupant may tend to pull 18 and 19 into substantially collinear relationship, but subject to the forward pull of 23.

Advantageously, the strap or belt connections are, wherever possible, effected by looping the strap around the relevant part and using e.g. a quick-release buckle or like attachment to secure the end of the strap back to the strap itself.

This constitutes a much surer fastening than in many prior restraints, wherein very often strap ends are simply clipped to the frame, with great propensity to break or unfasten under the forces to which accidents can give rise.

Preferably the harness straps or webbing are doubled where a strap is required to pass over a straight metal edge or such other formation as might sever the strap under large forces.

If desired the rear and/or front straps may incorporate length-adjusting means 26 of a ratchet or other known type. It may suffice for one pair to be so adjustable.

It will be evident from the foregoing that our restraint system is safe, simple and versatile.

For the purpose of this specification terms such as "front", "rear", "upwardly", "downwardly", "forwardly", "rearwardly", "top", "right", "left", "under" and "underneath" refer to the invention in a position of use in a vehicle moving forwards along a horizontal road. They are not to be read as necessarily limiting.

We claim:

1. A safety harness for a wheelchair/occupant system to be transported on a movable platform liable to sudden stoppage or other potentially dangerous rearward impulse, the platform having associated therewith rear anchor means to which the harness is adapted to secure the system, said harness including a lap belt for the occupant and on each side of the chair a buckle providing a connexion movable relative to the system, said buckle being connected to a respective end of the lap belt, a rear anchor strap for pulling the buckle downwardly and rearwardly, the anchor strap having a forward end connected to the buckle and a rearward end with fastener means for connecting same to said anchor means, and a holding strap associated with the anchor strap and connected to a forward part of the buckle via a chair part for pulling the buckle forwardly in response to decelerating forces applied direct to the chair via the holding strap.

2. A harness as claimed in claim 1 wherein said anchor means include baseplate units adapted to be fastened to the platform, and said fastener means comprises bolt means attached to the ends of anchor straps and adapted to be securably received by and engaged within a respective baseplate unit as to be manually disengageable therefrom.

3. A harness as claimed in claim 1 including front anchor straps and strap length adjustment means whereby at least one of said front and rear anchor straps are susceptible of length adjustment.

4. A harness as claimed in claim 1 including front anchor straps and quick release means whereby to release the straps of at least one of the front and rear anchor straps.

5. A harness for transmitting to a wheelchair/occupant system forces required to secure the system within a decelerating vehicle, including a harness connexion moveable relative to the system said harness connection comprising floating buckles at opposite ends of an occupant restraining strap associated with the wheelchair and the harness including means for tensioning the buckles forwardly in response to decelerating forces applied direct to the chair.

6. A harness as claimed in claim 5 wherein the harness has an anchor strap extending from each buckle for connection to anchor means on the vehicle behind the buckle and wherein said means for tensioning the buckles forwardly comprises a holding strap extending from a respective anchor strap to a forward part of the respective buckle around a part of the wheelchair.

* * * * *